Figure 1:
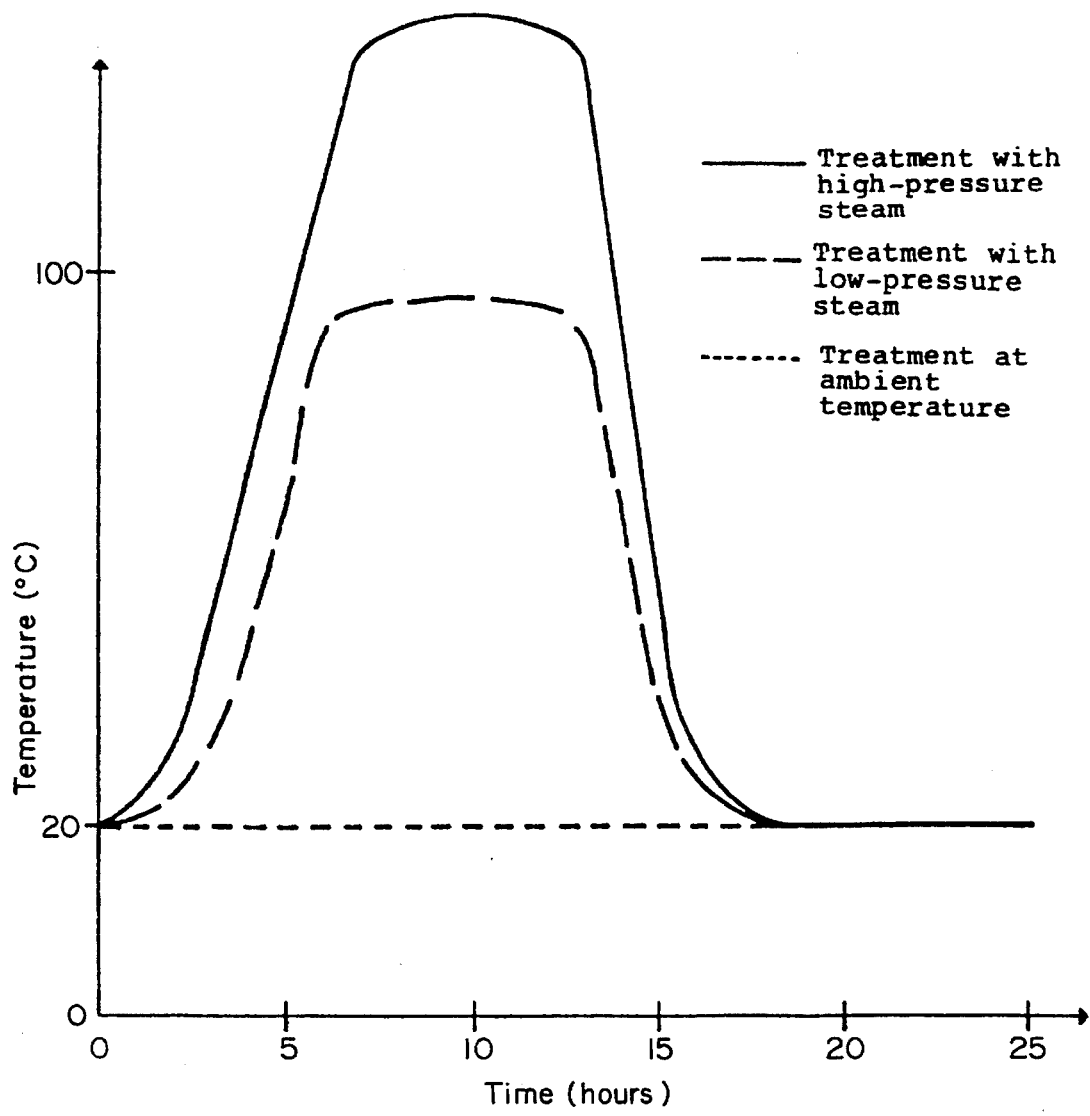

United States Patent

Collepardi

[11] Patent Number: 5,492,659
[45] Date of Patent: Feb. 20, 1996

[54] PROCESS FOR THE PRODUCTION OF CONCRETE TILES

[75] Inventor: Mario Collepardi, Treviso, Italy

[73] Assignee: Quarella S.R.L., Domegliara, Italy

[21] Appl. No.: 58,435

[22] Filed: May 7, 1993

[30] Foreign Application Priority Data

May 14, 1992 [IT] Italy .................. MI92A1145

[51] Int. Cl.⁶ .................. B28B 1/14; B28B 11/14
[52] U.S. Cl. .................. 264/82; 264/234; 264/157; 264/333; 264/345; 261/DIG. 31; 261/DIG. 43; 261/DIG. 59
[58] Field of Search .................. 264/82, 333, DIG. 31, 264/DIG. 43, DIG. 59, 157

[56] References Cited

U.S. PATENT DOCUMENTS

| | | | |
|---|---|---|---|
| 809,053 | 1/1906 | Gordon | 264/82 |
| 1,019,918 | 3/1912 | Reynolds et al. | 264/82 |
| 1,143,004 | 6/1915 | Westergard | 264/82 |
| 2,941,253 | 6/1960 | Jakobbsson | 264/DIG. 43 |
| 3,972,969 | 8/1976 | Rio et al. | 264/82 X |
| 4,057,608 | 11/1977 | Hashimoto et al. | 264/82 X |
| 4,083,908 | 4/1978 | Kalvenes et al. | 264/82 |
| 4,102,962 | 7/1978 | Matsui et al. | 264/82 |
| 4,599,211 | 7/1986 | Wise et al. | 264/DIG. 43 |
| 4,627,998 | 12/1986 | Akihama et al. | 264/82 |
| 4,655,979 | 4/1987 | Nakano et al. | 264/DIG. 59 X |

OTHER PUBLICATIONS

The "Chemistry of Cement and Concrete", Revised Edition of Lea & Desch, Edward Arnold (Publishers), Ltd, 1956, pp. 342–346 & 521–522.

*Primary Examiner*—Karen Aftergut
*Attorney, Agent, or Firm*—Bucknam and Archer

[57] ABSTRACT

Process for the production of concrete tiles by cutting a block of concrete mixture, characterized in that the block of mixture is subjected to a preliminary curing at room temperature for a duration of at least 24 hours or to a low-pressure steam treatment at a temperature <100° C. until the compression strength reaches a value of at least 20 MPa, and to a second treatment with steam in an autoclave. The cement tiles thus obtained may be bonded to the floor using a normal setting layer of cement mortar, without giving rise to any problems of detachment.

6 Claims, 2 Drawing Sheets

PROCESS FOR THE PRODUCTION OF CONCRETE TILES

BACKGROUND OF THE INVENTION

Concrete slabs, in the form of square or oblong tiles, are generally produced by means of a process comprising the following stages: a) mixing of the cement and aggregates with water until a firm consistency is obtained; b) placing of the mixture inside a cube- or prism-shaped formwork (more than 1-meter thick) so as to produce a compact block; c) vibration of the concrete mixture placed inside the formwork, with removal of the air pockets trapped inside also using vacuum techniques; d) allowing the concrete block to set inside the formwork at ambient temperature, for about 1 day, and then removal of the hardened block from the formwork; e) wet-curing of the hardened block for at least 1 month at room temperature, so as to increase the compression strength to a level of about 50 MPa; f) cutting of the concrete blocks into slabs of 10 to 30 mm thickness; g) polishing of the upper surface of the concrete slabs so as to produce an effect similar to that of enamelled ceramic tiles.

The concrete tiles produced using the abovementioned process may be laid on a rough floor using conventional setting adhesives consisting of cementitious mortar, bicomponent organic polymers or other special glues available on the market. Generally, cementitious mortars are more economical, safer and easier to use than adhesives consisting of non-aqueous polymers. However, when a cementitious mortar is used as an adhesive material between the floor and the concrete tiles, there is an immediate differential swelling due to the presence of the mixing water in the fresh cementitious mortar. In reality, this water is rapidly absorbed by the porous base of the concrete, resulting in a dimensional increase in the base of the concrete tile in contact with the layer of fresh setting cementitious mortar, while no significant dimensional change occurs in the top part of the slab exposed to the surrounding environment. Differential swelling results in partial separation of the base of the concrete tile from the layer of setting cementitious mortar on the floor. In other words, the bottom part of the concrete tile, in contact with the water of the fresh cementitious mortar, tends to increase in dimensions compared to the upper surface. The differential change in dimensions causes convex flexure of the side of the concrete tile exposed to the air, the central part of which rises up higher than the peripheral part.

The drawback of separation occurs when the thickness of the concrete tile is reduced—for example from 30 to 10 mm—and/or when the relative humidity of the environment drops—for example from 70% to 50%—since, in these cases, the swelling which occurs on the base of the concrete tile in contact with the water is accompanied and aggravated by shrinkage of the upper surface exposed to the air.

SUMMARY OF THE INVENTION

In order to eliminate the serious drawback of detachment, a new process has been found, to which the present invention refers, for the production of concrete tiles with improved swelling/drying characteristics. With the present invention it is possible to produce concrete tiles which are bonded to the floor using a normal setting layer of cementitious mortar which does not give rise to any problems of detachment caused by differential swelling due to absorption of the water by the concrete tiles from the cement mortar.

The process of the present invention is based on a high-pressure steam treatment (autoclave process) applied after a long period of curing of the concrete at ambient temperature (at least 1 day) or a prolonged low-pressure steam treatment for a period of time sufficient to reach a compression strength of at least 20 MPa prior to the autoclave process. Since temperatures higher than 100° C. and hence steam pressures greater than atmospheric pressure are involved, the steam treatment chamber must be of the pressure-resistant type (autoclave).

In technical literature it is well-known that concrete, when subjected to steam treatment in an autoclave, is characterized by a reduced degree of shrinkage due to drying and by reduced creeping due to the humidity. However, when a conventional autoclave steam treatment cycle is used for hardening of the concrete block in side the formwork (instead of the aforementioned stage d) at ambient temperature), no significant reduction is obtained in either the swelling or the drying contraction of the concrete tiles produced by cutting the block.

Figure 2:
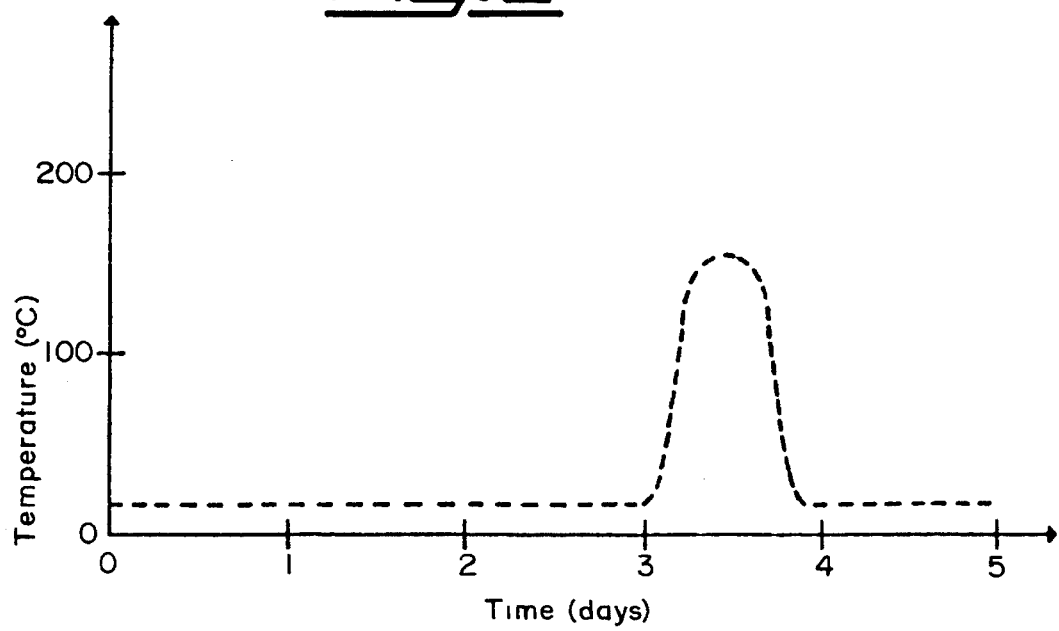
Figure 3:
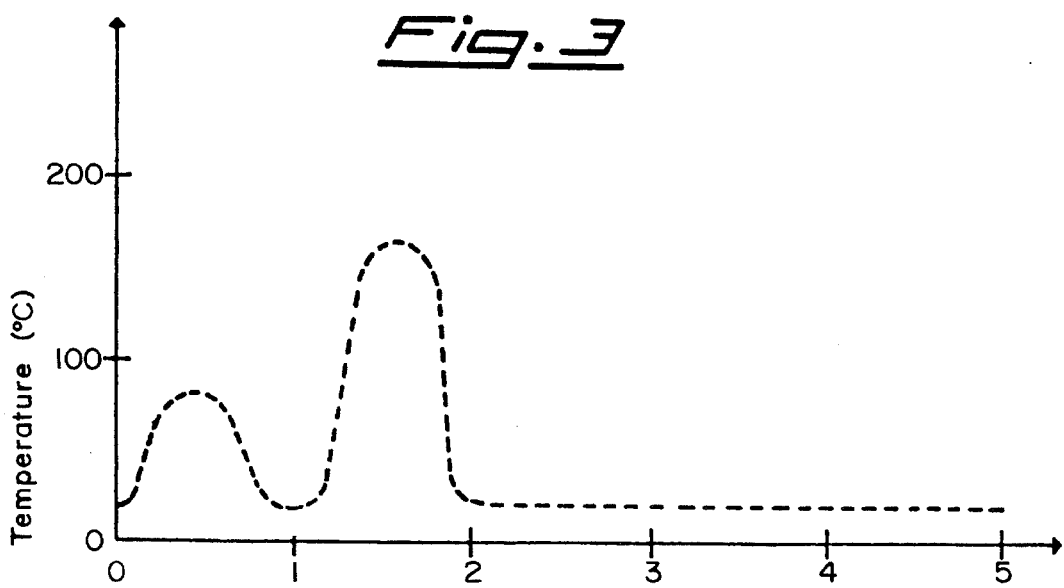

FIG. 1 shows in diagrammatic form conventional treatment of concrete at ambient temperature and at a high temperature (FIG. 1) compared to treatment in an autoclave according to the present invention (FIGS. 2 and 3).

A typical steam exposure cycle (A. C. I. Committee 516 "High-pressure steam treatment: modern practice and properties of products subjected to an autoclave", Journal of American Concrete Institute, 62, 806–908, 1965) consists in a gradual increase up to a maximum temperature of approximately 180° C. over a period of 3 hours. This stage is followed by 5 to 8 hours at this temperature and then by release of the steam pressure over 20 to 30 minutes.

It has been discovered surprisingly that, in order to improve the swelling/drying contraction characteristics of the concrete slabs expressly produced according to the present invention, an extremely particular cycle must be adopted, involving exposure to steam in an autoclave (which differs greatly from that mentioned above and commonly used in the prefabricated parts industry): the key difference between the conventional autoclave process and the process according to the present invention, is the need for a long period of treatment at ambient temperature (more than 1 day) before commencing the high-pressure steam treatment specifically required for the production of concrete tiles according to the present invention. This specific preliminary treatment (curing) at ambient temperature should be of a duration such that the concrete reaches the compression strength of at least 20 MPa, before passing to the autoclave process. This unusually long period of time for curing at ambient temperature (corresponding to a threshold value of 20 MPa for the compression strength of the concrete) is not required by the conventional autoclave process normally applied to prefabricated structures which must be produced and delivered within extremely short time limits (less than 1 day).

For the specific object of the process according to the present invention, the target of a compression strength threshold (20 MPa), prior to the autoclave process, can be achieved, as an alternative and with successful results, by a low-pressure (atmospheric pressure) steam treatment, instead of a longer curing at ambient temperature; furthermore, it is well known (A. M. Neville "Properties of Concrete", pp 280–286, Second Edition, Pitman Publishers, London 1975) that the products resulting from a process involving treatment with low-pressure steam (temperature <100 ° C.) are very similar to those produced at ambient temperature, and that both these products are completely different from those obtained with a high-pressure steam treatment (temperature >100° C.).

The following Examples illustrate further the process for producing concrete tiles according to the present invention.

EXAMPLE 1

A concrete mixture (A) was produced by mixing the ingredients in the following proportions: high-strength Portland cement ("525" according to Italian Standards)=450 kg/m$^3$; water=160 kg/m$^3$; "Addiment", a melamine-based superplasticizer=4.5 kg/m$^3$; fine sand (0–1 mm)=700 kg/m$^3$; ballast (1.2–35 mm)=1100 kg/m$^3$.

The concrete mixture A (1 m$^3$) was vibrated and treated during the following five different cycles:

a) Curing at ambient temperature for 28 days and then cutting of the concrete blocks into 20 mm thick slabs;

b) Conventional steam treatment in an autoclave: from 20° C. to 150° C. over 3 hours; 8 hours at this temperature; release of the pressurised steam over 30 minutes; curing at ambient temperature for 28 days and then cutting of the concrete block into 20 mm thick tiles;

c) Process according to the present invention: curing at ambient temperature for 1 day (compression strength after 1 day=25 MPa); treatment with pressurized steam from 20° C. to 150° C. over 3 hours; 8 hours at this temperature; release of the pressurised steam over 30 minutes; curing at ambient temperature for 28 days and then clotting of the concrete block into 20 mm thick tiles;

d) Process according to the pre sent invention: low-pressure steam treatment consisting in heating for 2 hours from 20° C. to 70° C.; 12 hours at this temperature; 10 hours natural cooling at ambient temperature (compression strength after 1 day=45 MPa); autoclave process consisting of 3 hours heating from ambient temperature to 150° C.; 8 hours at this temperature; release of pressurised steam over 30 minutes; curing at ambient temperature for 28 days and then cutting of the concrete blocks into 20 mm thick tiles;

e) Process according to the present invention, following the same steam cycle as that indicated in c) of this example, except for cutting of the concrete block into 20 mm thick tiles, completed 1 day prior to subsequent autoclave treatment.

Table 1 shows the compression strength obtained after 28 days (150 cubic mm test-piece) and the results of the dimensional variation tests carried out on prism-shaped slabs 20 mm thick, 150 mm wide and 300 mm long. The dimensional variation tests at 20° C. include both swelling of the test-pieces kept under water for 60 days and shrinkage of the test-pieces left in open air with a relative humidity of 50%. The data given in Table 1 show that the concrete tiles produced with the heat cycles c), d) and e), all relating to the present invention, are more stable (less swelling and shrinkage) than the test-pieces produced with the treatment at ambient temperature a) and even with the conventional autoclave process b).

An X-ray diffraction analysis, at the end of the process according to the present invention, reveals the hydrated silicates enriched with tobermorite (5CaO.6SiO$_2$.5H$_2$O) and calcium, such as 6CaO, SiO$_2$, 3H$_2$O or α-2CaO.SiO$_2$.H$_2$O.

TABLE 1

Compression strength of cube-shaped test-pieces and swelling/shrinkage of tiles produced from the concrete mixture A of Example 1

| Type of cycle described in Example 1 | Comp. str. at 1 day (MPa) | Comp. str. at 28 days (MPa) | Swelling after imm. for 60 days | Shrinkage after drying at 50% RH |
|---|---|---|---|---|
| a) | 25 | 60 | 400 * 10$^{-6}$ | 600 * 10$^{-6}$ |
| b) | 60 | 70 | 220 * 10$^{-6}$ | 180 * 10$^{-6}$ |
| c) | 25 | 72 | 140 * 10$^{-6}$ | 80 * 10$^{-6}$ |
| d) | 45 | 68 | 135 * 10$^{-6}$ | 75 * 10$^{-6}$ |
| e) | 25 | 70 | 130 * 10$^{-6}$ | 50 * 10$^{-6}$ |

EXAMPLE 2

A concrete mixture was produced by mixing the ingredients in the following proportions: high-strength Portland cement=350 kg/m$^3$, finely ground quartz (specific surface area of 5000 cm$^2$/g)=85 g ; water= 160 kg/m$^3$; "Addiment", a melamine-based superplasticizer=4.5 kg/m$^3$; fine sand (0–1 mm)=700 kg/m$^3$; ballast (1.2–35 mm)=1100 kg/m$^3$. Therefore, this mixture (B) is substantially the same as that described in Example 1 (A), except for the fact that 100 kg of cement were replaced by the same quantity of ground quartz (85 kg), taking account of the specific volume of the cement (3.14 g/cm$^3$) and of the ground quartz (2.70 g/cm$^3$) used.

The two mixtures, A and B, were treated thermally with the cycle e) according to the present invention and described in Example 1.

Table 2 shows the results relating to the compression strength, swelling and shrinkage. These data show that by replacing a certain quantity of cement with finely ground quartz, the reduction in the swelling and contraction which can be obtained with the process according to the present invention is even greater.

Again, according to the present invention, tobermorite and other hydrated calcium silicates are present at the end of the process.

TABLE 2

Compression strength of cube-shaped test-pieces and swelling/shrinkage of the tiles produced from the concrete mixture (Example 1) and B (Example 2), both with the same cycle e) (Example 1)

| Type of mix | Type of cycle (MPa) | Comp. str. at 1 day (MPa) | Comp. str. at 28 days (MPa) | Swelling after imm. for 60 days | Shrinkage after drying at 50% RH |
|---|---|---|---|---|---|
| A) Ex. 1 | e) Ex. 1 | 25 | 70 | 130 * 10$^{-6}$ | 50 * 10$^{-6}$ |
| B) Ex. 2 | e) Ex. 1 | 20 | 72 | 80 * 10$^{-6}$ | 40 * 10$^{-6}$ |

What is claimed is:

1. A process for the production of concrete tiles having decreased swelling and drying shrinkage characteristics which consists essentially of:

a) mixing Portland cement or Portland cement and quartz with aggregates and water to form a concrete mixture;

b) forming said concrete mixture into a block;

c) pretreating said block until a compression strength of the concrete thereof is at least 20 MPa;

d) treating said block with steam in an autoclave; and e) cutting said treated block into concrete tiles.

2. The process for the production of concrete tiles as defined in claim 1, wherein said pretreating step of said block comprises subjecting said block to ambient temperature for a duration of at least 24 hours.

3. The process for the production of concrete tiles as defined in claim 1, wherein the step of treating said block with steam in an autoclave is effected at a temperature higher than 100° C.

4. The process for the production of concrete tiles as defined in claim 1, wherein said pretreating step of said block comprises subjecting said block to low pressure steam treatment at a temperature lower than 100° C.

5. The process for the production of concrete tiles as defined in claim 1, wherein said concrete mixture is formed by mixing Portland cement or a mixture of Portland cement and quartz with water, sand and a melamine-based superplasticizer.

6. A process for the production of concrete tiles having decreased swelling and drying characteristics which consists essentially of:

a) mixing Portland cement or Portland cement and quartz with aggregates and water to form a concrete mixture;

b) forming said concrete mixture into a block;

c) pretreating said block until a compression strength of the concrete thereof is at least 20 MPa;

d) cutting said pretreated block into concrete tiles; and e) treating said tiles with steam in an autoclave.

\* \* \* \* \*